United States Patent [19]
Romi

[11] Patent Number: 5,960,690
[45] Date of Patent: Oct. 5, 1999

[54] MACHINE TOOL INCORPORATING MEANS FOR SELECTIVELY ENGAGING A CONTROL DEVICE TO A CARRIAGE

[75] Inventor: Jose Carlos Romi, Santa Barbara d'Oeste, Brazil

[73] Assignee: Industrias Romi S.A., Santa Barbara d'Oeste, Brazil

[21] Appl. No.: 08/960,148

[22] Filed: Oct. 29, 1997

[30] Foreign Application Priority Data

Apr. 4, 1997 [BR] Brazil ..................................... 9700507

[51] Int. Cl.⁶ ..................................................... B23B 7/00
[52] U.S. Cl. ............................... 82/133; 82/134; 82/135; 82/118
[58] Field of Search .............................. 82/132, 135, 100, 82/140, 141, 153, 154, 158, 161, 118, 133, 134, 136; 74/608, 609, 612, 613, 614, 615, 616

[56] References Cited

U.S. PATENT DOCUMENTS

| | | | |
|---|---|---|---|
| 2,584,963 | 2/1952 | Hoelscher | 82/135 |
| 2,859,290 | 11/1958 | Grinage | 82/118 X |
| 3,300,013 | 1/1967 | Fisher | 82/132 |
| 3,392,611 | 7/1968 | Carroll | 82/135 |
| 3,426,628 | 2/1969 | Schumacher | 82/135 |
| 4,685,361 | 8/1987 | Myers | 82/117 |
| 5,816,123 | 10/1998 | Schauer | 82/118 X |

*Primary Examiner*—Andrea L. Pitts
*Assistant Examiner*—Henry W. H. Tsai
*Attorney, Agent, or Firm*—Steinberg & Raskin, P.C.

[57] ABSTRACT

A machine tool such as a lathe including a control device for enabling manual operation of carriages which are movable in mutually orthogonal directions. During manual operation, the control device and the longitudinally moving carriage are moved in tandem. The control device may be disengaged from the carriage, e.g., for safety reasons, such that rapid movement of the carriages under the control of an automatic control unit is possible. The control device has rollers disposed in guideways arranged on a stationary support connected to the lathe bed. The stationary support may similarly include guideways for sidably supporting movable covers. A lever selectively engages or disengages the control device and the carriage. Upon engagement of the control device and the carriage, an inductive proximity switch is actuated to prevent rapid traverse of the carriages.

22 Claims, 7 Drawing Sheets

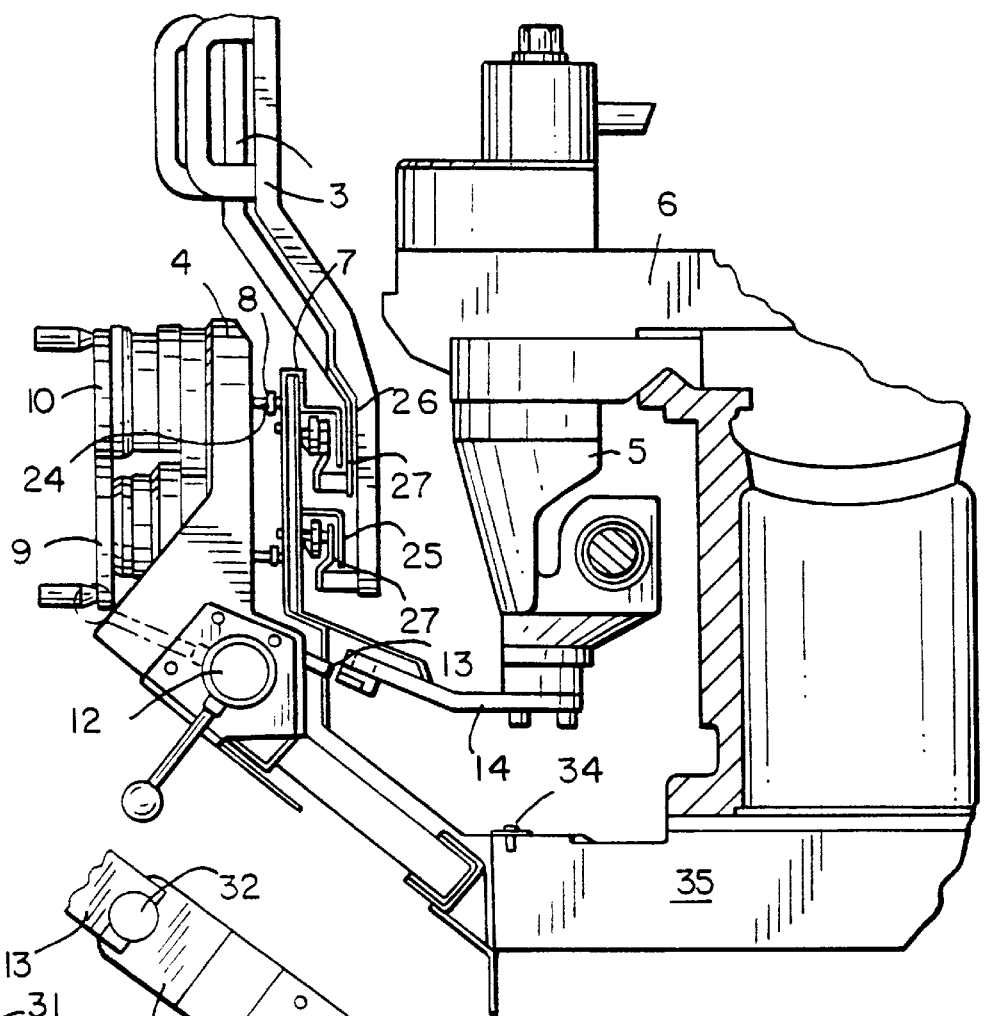
FIG. 3
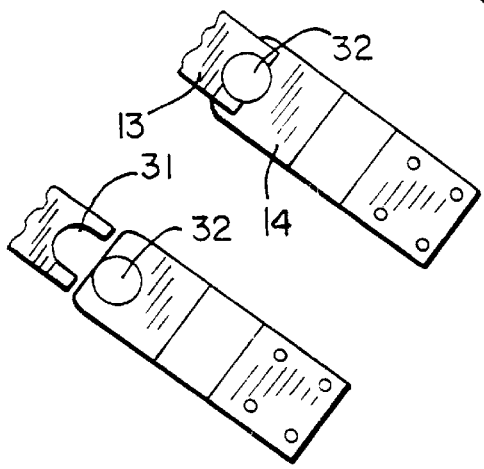
FIG. 4a
FIG. 4b

5,960,690

MACHINE TOOL INCORPORATING MEANS FOR SELECTIVELY ENGAGING A CONTROL DEVICE TO A CARRIAGE

FIELD OF THE INVENTION

The present invention relates to machine tools, such as lathes, incorporating means for selectively engaging and disengaging a control device to a carriage.

BACKGROUND OF THE INVENTION

It is known in the art to control machine tools, such as lathes for example, by a computerized numerical control (CNC). In this respect, a CNC machine tool may be operated automatically, i.e., without interference or input from an operator, or in the alternative, the machine tool may be provided with a control device enabling control of elements of the machine tool by an operator. For example, an operator may perform manual turning operations on a workpiece held on a headstock chuck of a lathe.

In general, a lathe has at least two slidable carriages acting mutually orthogonally, i.e., in directions perpendicular to one another, and conventionally, a manually operable control device is fixed to the longitudinally movable carriage for control thereof and movement therewith. However, since this control device moves with the carriage, the speed of traverse or movement of the carriage is often limited to avoid the risk of injury arising if the control device were to collide with the operator's body. Indeed, in some countries the speed of movement of the longitudinally movable carriage is restricted to a few meters per minute to prevent any such accidents from occurring. Obviously, it is drawback that production speeds are reduced whenever a limitation on the carriage speed is enforced or maintained.

OBJECTS AND SUMMARY OF THE INVENTION

It is an object of the present invention to avoid the drawback of the prior art machine tools noted above.

It is another object of the present invention to provide a new and improved machine tool in which a control device for manual operation of a carriage is selectively engageable and disengageable with the carriage depending on the mode of operation, e.g., automatic or manual.

In order to attain these objects and others, in accordance with a first embodiment of the present invention, a machine tool comprises a carriage movable in a longitudinally direction of the machine, and a control device enabling an operator to control movement of this carriage in the longitudinal direction. The machine tool has a fixed or stationary support on which the control device is supported for movement longitudinally of the machine tool, i.e., in the longitudinal direction of the machine tool, and engaging means for enabling the carriage and the control device to be selectively engaged for longitudinal movement in tandem and selectively disengaged.

In one particular embodiment of the machine tool in accordance with the invention, the carriage and the control device are engaged for control of the carriage by an operator. Preferably, the engaging means incorporates means for preventing rapid traverse of the carriage when the control device and the carriage are engaged. Thus, when the control device is moving with the carriage, the speed of movement of the carriage, and hence of the control device, is kept low. However, on the other hand, when manual control of the carriage movement is not required, for example, when the machine tool is operated automatically, the carriage and the control device may be disengaged such that during the movement of the carriage there is no corresponding movement of the control device. In these circumstances, the carriage can be moved safely at much more rapid speeds. The rapid traverse preventing means may comprise a switch actuatable by engagement of the carriage and the control device.

In one preferred embodiment, a machine tool of the invention further comprises at least one movable cover to cover the carriage, wherein the cover(s) is/are supported on the fixed support for movement longitudinally of the machine tool. Indeed, it is particularly convenient to support the cover(s) on the fixed support provided for the control device.

The fixed support for supporting the control device may be configured as appropriate. In one preferred embodiment, the fixed support comprises an upwardly oriented wall fixed with respect to a bed or foundation of the machine tool and cooperating guide means supported on the control device and on the wall for enabling sliding movement of the control device longitudinally of the machine tool.

The cooperating guide means may be arranged in any appropriate manner. For example, the cooperating guide means may comprise longitudinally extending guideways defined by or arranged on the wall or the control device, and rollers arranged on the other of the control device and the wall to slide within the guideways.

When each movable cover is also supported for longitudinal movement on the fixed support, it is convenient to further provide cooperating guide means supported on the movable cover and on the wall for enabling sliding movement of each cover longitudinally of the machine tool. Preferably, these cooperating guide means comprise longitudinally extending guideways defined by or arranged on one of the wall and the movable cover, and rollers arranged on the other of the movable cover and the wall to slide within the guideways.

The movable cover or covers will generally enclose the moving parts of the machine tool, and in particular the carriage or carriages thereof. Preferably, one end of each movable cover will be supported for sliding movement on the fixed support, with the other end thereof similar supported for sliding movement on a housing of the machine tool.

In one specific embodiment, the engaging means enabling the carriage and the control device to be selectively engaged comprises at least one projection carried by one of the carriage and the control device, each projection being engageable in a corresponding recess in the other of the control device and carriage, and means for moving each projection or recess selectively into and out of engagement with the corresponding recess or projection.

In some preferred embodiments, the control device has a generally transversely movable rack in which the at least one recess of the engaging means is formed, movement of this rack resulting in movement of each recess into or out of engagement with the projection arranged in connection with the carriage.

If the engaging means incorporate means for preventing rapid traverse of the carriage when the control device and the carriage are engaged, movement of the rack can be caused to actuate a switch. In one embodiment, the switch is a proximity switch which is actuated inductively.

In certain embodiments, the machine tool is a CNC lathe having at least two carriages which are movable mutually orthogonally, i.e., perpendicular to one another. The control device is arranged to actuate encoders for motors arranged to move the carriages. The control device may also enable actuation of a main electric motor.

In accordance with another aspect of the present invention, the machine tool comprises at least one movable carriage, one or more movable covers for controlling access to each carriage, a fixed or stationary support on which each cover is supported for sliding movement along the support, and a control device enabling an operator to control movement of each carriage and which is supported on the fixed support for sliding movement. The machine tool in accordance with this second aspect of the present invention may incorporate each or any of the features defined above of the first aspect of the invention.

BRIEF DESCRIPTION OF THE DRAWINGS

A more complete appreciation of the present invention and many of the attendant advantages thereof will be readily understood by reference to the following detailed description when considered in connection with the accompanying drawings in which:

FIG. 3 shows an enlarged view of the marked area 3 of FIG. 2 illustrating the supporting structure for a control device;

FIGS. 4A and 4B illustrate engaging means for engaging the control device and a lathe carriage, the engaging means being shown in their engaged position in FIG. 4A and in their disengaged position in FIG. 4B;

DETAILED DESCRIPTION OF THE PREFERRED EMBODIMENTS

Figure 1:
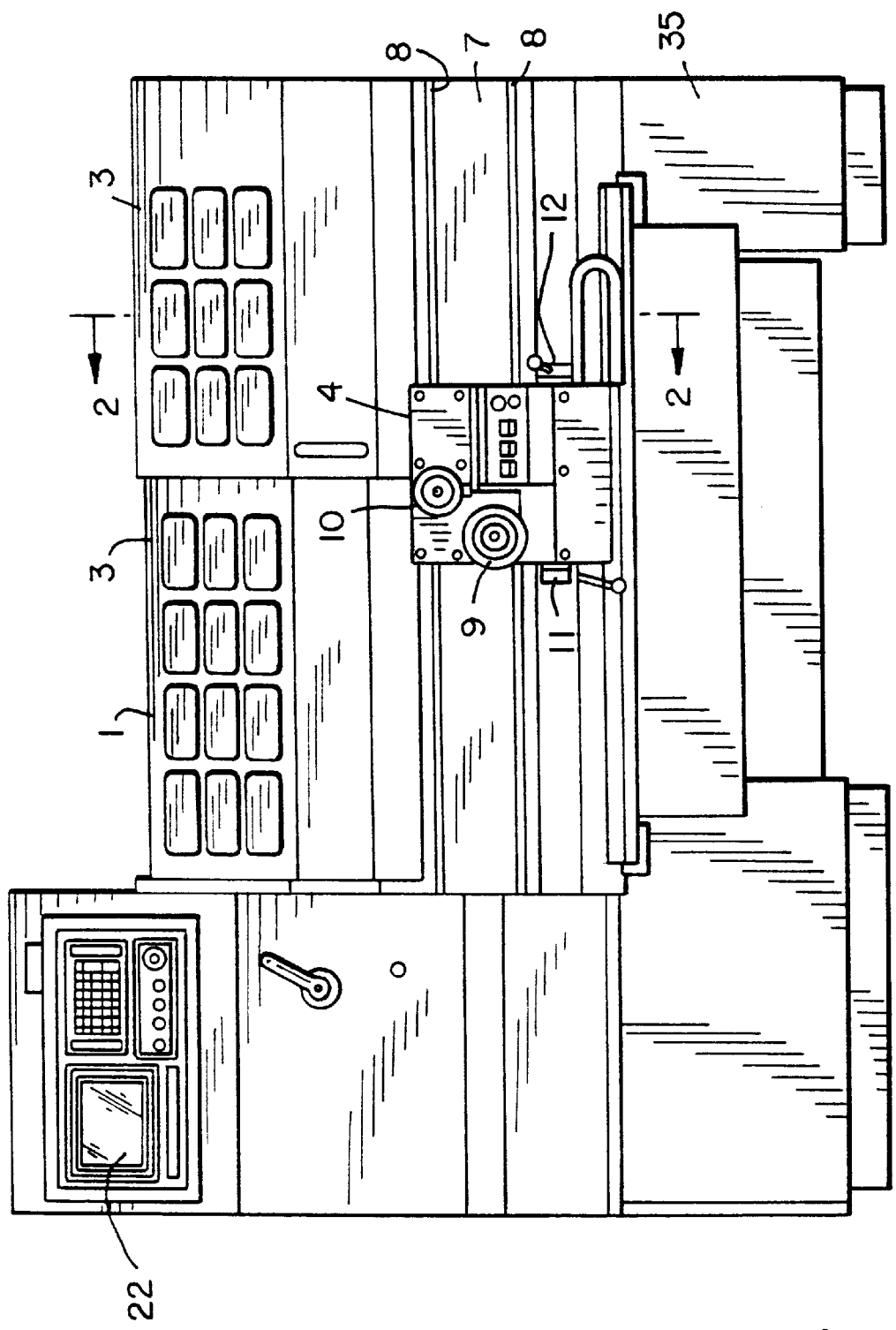
FIG. 1 shows a front elevation of a CNC lathe in accordance with the invention.

The present invention is specifically described herein with reference to a computerized numerical control (CNC) lathe. However, it should be apparent to those skilled in this art that this invention is equally applicable to machine tools in general.

Referring to the accompanying drawings wherein like reference characters designate identical or corresponding parts throughout the several views, a CNC lathe 1 includes a lathe bed or foundation 35 which supports two carriages 5 and 6 for movement in mutually orthogonal directions, i.e., in direction perpendicular to one another. The lower carriage 5 is movable in what may be considered the longitudinal direction of the machine and the upper carriage 6 is movable in a direction transverse to the longitudinal direction of the machine. Two movable covers 3 are provided to enclose the carriages 5, 6 and protect an operator during operation of the machine. For automatic operation of the lathe 1, a CNC control unit 22 is provided to effect automatic operation of the carriages 5,6. Similarly, in a known manner, the lathe 1 is also provided with a control device 4 enabling an operator to manually control the operation of the carriages 5, 6.

Both the control device 4 and the movable covers 3 are supported for sliding movement in the longitudinal direction of the machine tool by a fixed or stationary support member 7. This fixed support 7 is a generally upstanding wall made of a sturdy material such as metal which is fixed by appropriate connecting means such as screws 34 to the lathe bed 35 (FIG. 3). As shown most clearly in FIG. 3, the support 7 includes guide means for guiding movement of the control device 4. Specifically, the support 7 includes elongate guideways or channels 8 on an outwardly facing surface which extend longitudinally of the machine, i.e., in the longitudinal direction of the machine. Rollers or wheels 24 are connected to the control device 4 and slidably received within the guideways 8 so that longitudinal sliding movement of the control device 4 is enabled. Similarly, on an inwardly facing surface, the support 7 includes guide means for guiding movement of the covers 3. Specifically, the support 7 includes vertically spaced upper and lower elongate guideways 27. One end of a first movable cover 3 is provided with rollers 26 engageable within the upper guideway 27, whereas one end of the second movable cover 3 has rollers 25 engageable within the lower guideway 27. Accordingly, the covers 3 slide by virtue of the cooperation of the rollers 25,26 connected thereto within the guideways 27 on the support 7.

Figure 2:
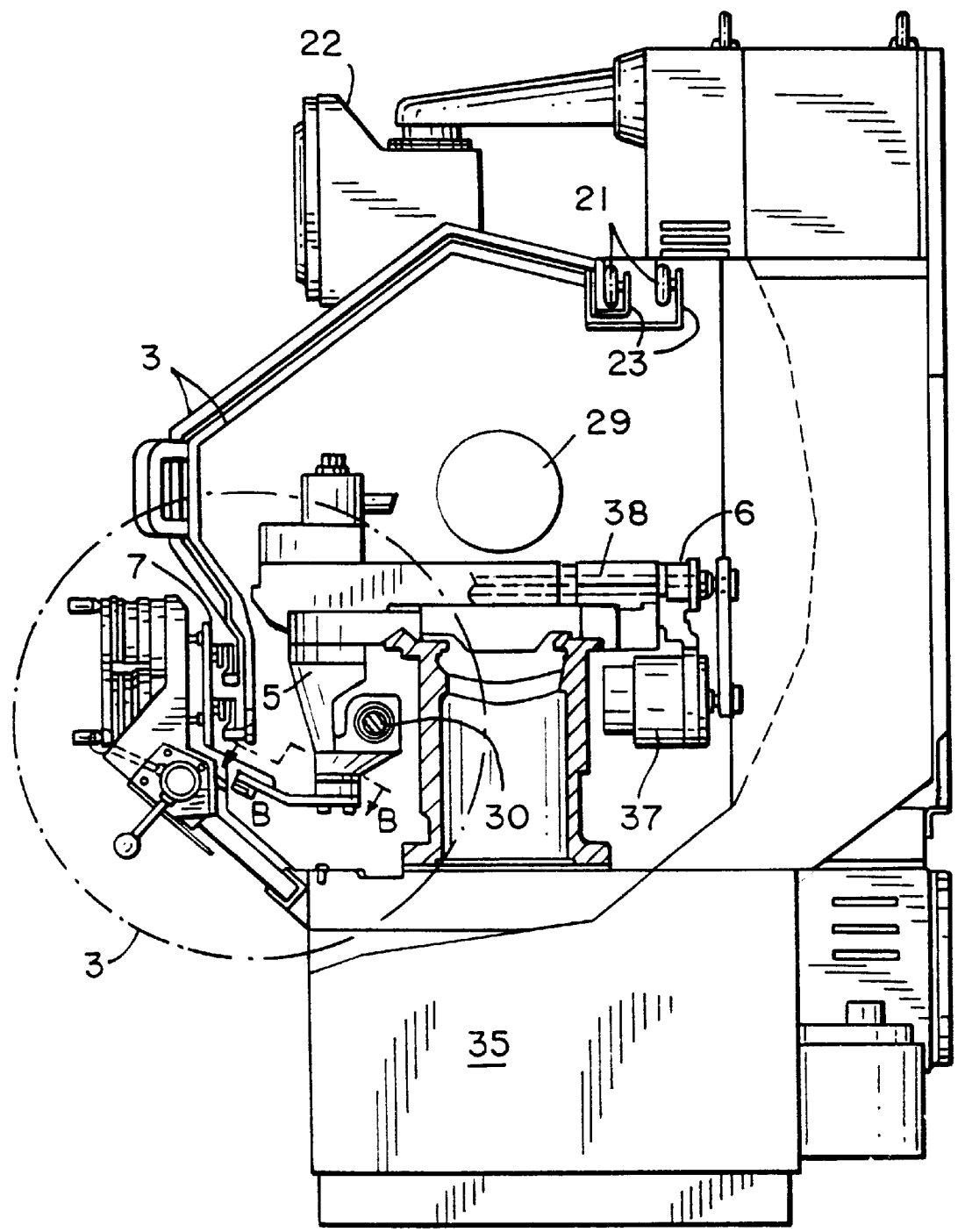
FIG. 2 is a cross-sectional view of the lathe of FIG. 1 taken along the line 2—2.

As shown in FIG. 2, the other end of each of the movable covers 3 is similarly supported by way of cooperating guide means comprising guideways generally indicated at 23 arranged on the machine tool housing and rollers 21 connected to the covers 3. The rollers 21 are positioned within the guideways 23 whereby the cooperating guide means provide for sliding movement of the two covers 3. It will be appreciated that the two covers 3 may slide longitudinally of the machine to reveal or enclose the carriages 5 and 6 as is required. Other guide means for facilitating sliding movement of the covers may also be provided without deviating from the scope and spirit of the invention.

The structure of the lathe 1, and its drive means, may be conventional and does not form part of the present invention. However, to provide the necessary background of the invention, a conventional lathe 1 that may be used in accordance with the invention has a main motor (not shown) for driving the lathe headstock. An headstock chuck is indicated at 29 in FIG. 2. In addition, FIG. 2 shows an electric motor 37 and a cooperating ball screw 38 which drive the transversely movable carriage 6. Similarly, a ball screw 30 is actuated by an electric motor (not visible) and drives the longitudinally movable carriage 5.

Figure 5:
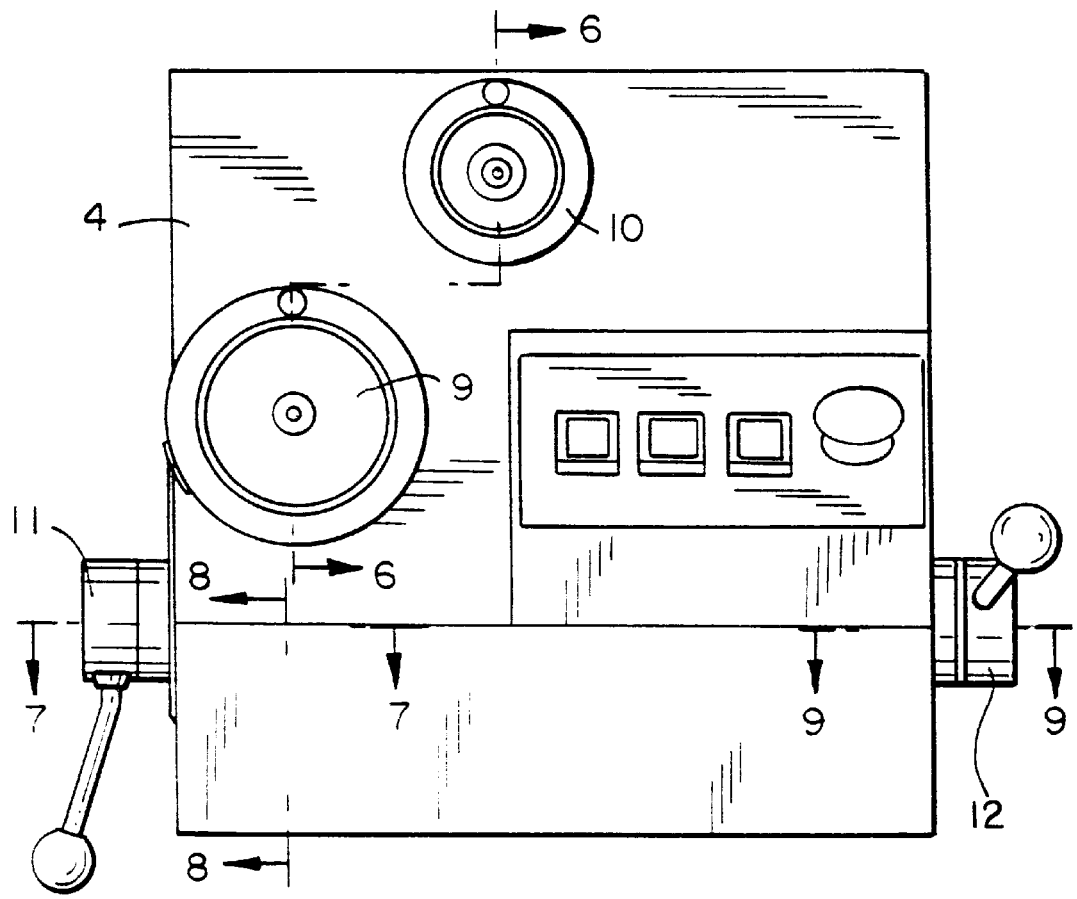
FIG. 5 shows a front elevation view of the control device of the lathe of FIG. 1.
Figure 6:
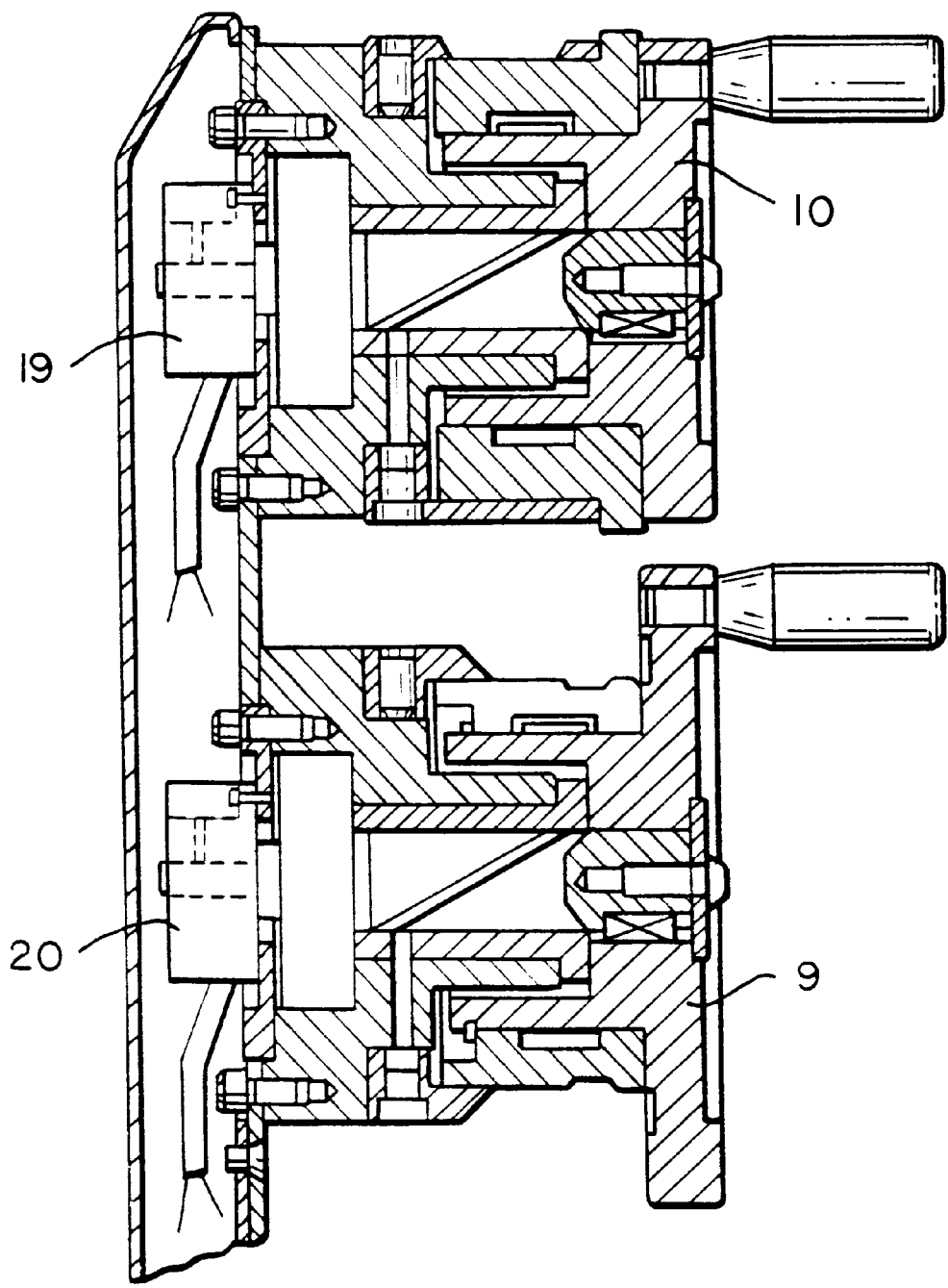
FIG. 6 shows a cross-sectional view of the control device taken along the line 6—6 of FIG. 5.

Referring now to FIGS. 5 and 6, the control device 4 comprises two substantially circular, control handwheels 9 and 10. The control handwheel 10 is arranged such that rotation thereof will move the upper, transversely movable carriage 6. More particularly, the rotation of the handwheel 10 rotates an encoder 19 which causes corresponding rotation of the motor 37 whereby the carriage 6 is moved. Similarly, rotation of the control handwheel 9 causes rotation of a corresponding encoder 20 which actuates the electric motor causing longitudinal movement of the carriage 5.

When the carriages 5 and 6 are being moved manually by the operator by way of the control device 4, it is required that the control device 4 move with the carriage 5, for example, to enable positional information to be displayed by the control device 4 in a known manner. Accordingly, engaging means 13, 31, 32 and 14 (each of these elements are discussed below) are arranged to be selectively actuatable by a lever 11 to engage the control device 4 and the carriage 5 for longitudinal movement in tandem.

Figure 7:
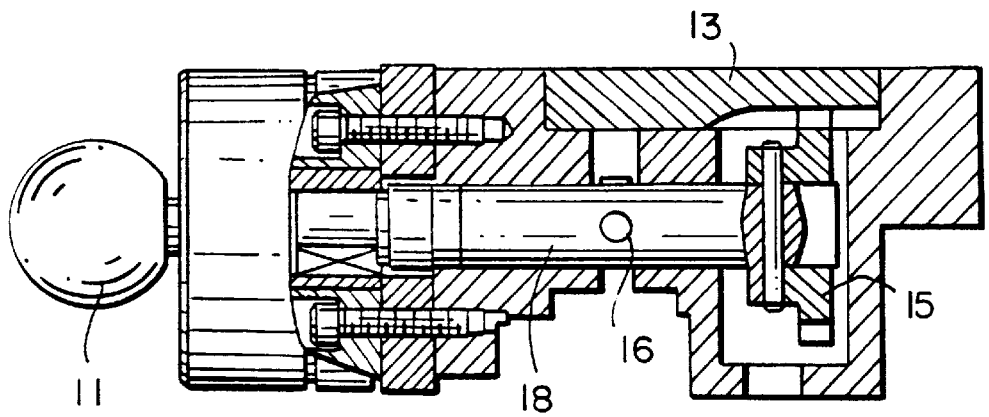
FIG. 7 shows a cross-sectional view of the control device taken along the line 7—7 of FIG. 5.

Rotation of the lever 11 causes rotation of a longitudinally extending shaft 18 and consequently, rotation of a gear 15 carried on the shaft 18 (FIG. 7). The gear 15 engages with a transversely extending rack 13. It will be immediately apparent, therefore, that rotation of the lever 11, and hence of the shaft 18, moves the rack 13 generally transversely towards or away from the carriage 5.

As shown in FIG. 3, the carriage 5 has an arm 14 fixed thereto and extend transversely therefrom. At its end, the arm 14 carries a depending pin 32 or another similar type of projection. The rack 13 is connected with the control device 4 and has a recess 31 at its end corresponding in shape and size to the pin 32, or other projection. As shown in FIGS. 4A and 4B, when the rack 13 is moved by the lever 11 to the engagement position, the pin 32 is received within the recess 31 as shown in FIG. 4A. In this case, the carriage 5 and the control device 4 are coupled for longitudinal movement in tandem (i.e., an engaged position). If the lever 11 is then returned to its original position, the rack 13 is retracted, and the carriage 5 and the control device 4 are disengaged as indicated in FIG. 4B (i.e., a disengaged position). As an alternative construction to the illustrated embodiment, the projection may be arranged on a member associated with the control device 4, e.g., the rack, and the recess associated with the carriage 5. In this case, the projection on the control device will be displaced with the rack into the recess on the carriage.

Figure 8A:
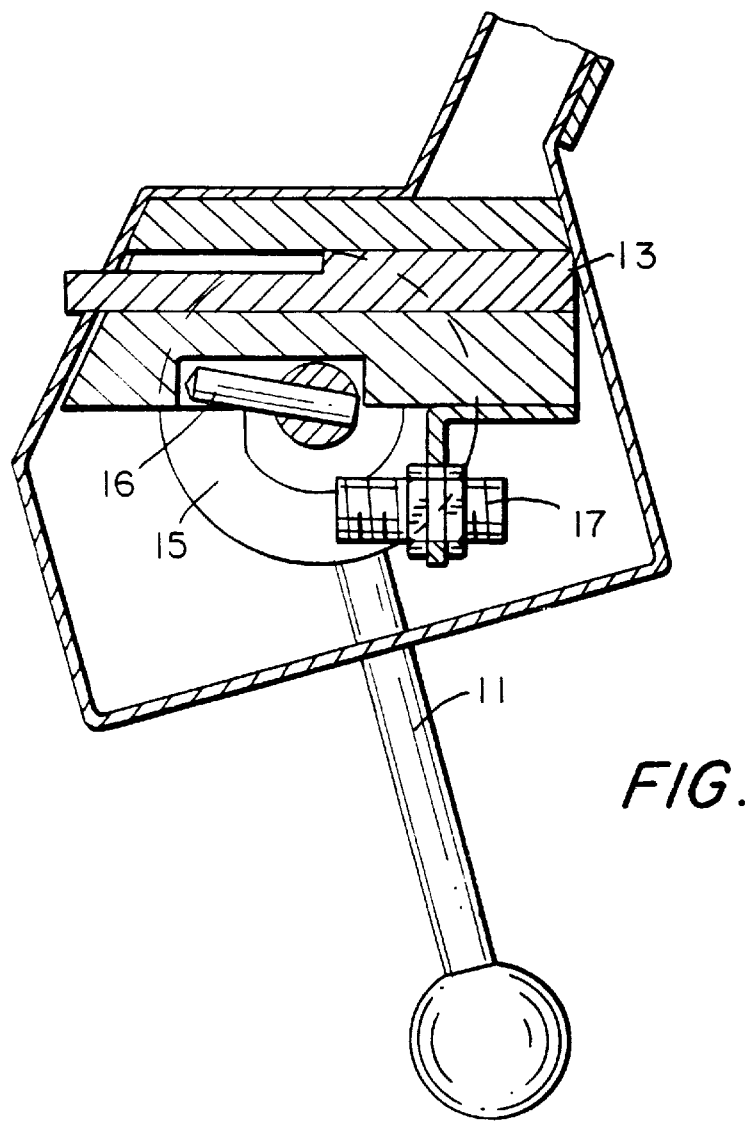
FIG. 8A shows a cross-sectional view of the control device taken along the line 8—8 of FIG. 5 in the disengaged condition.
Figure 8B:
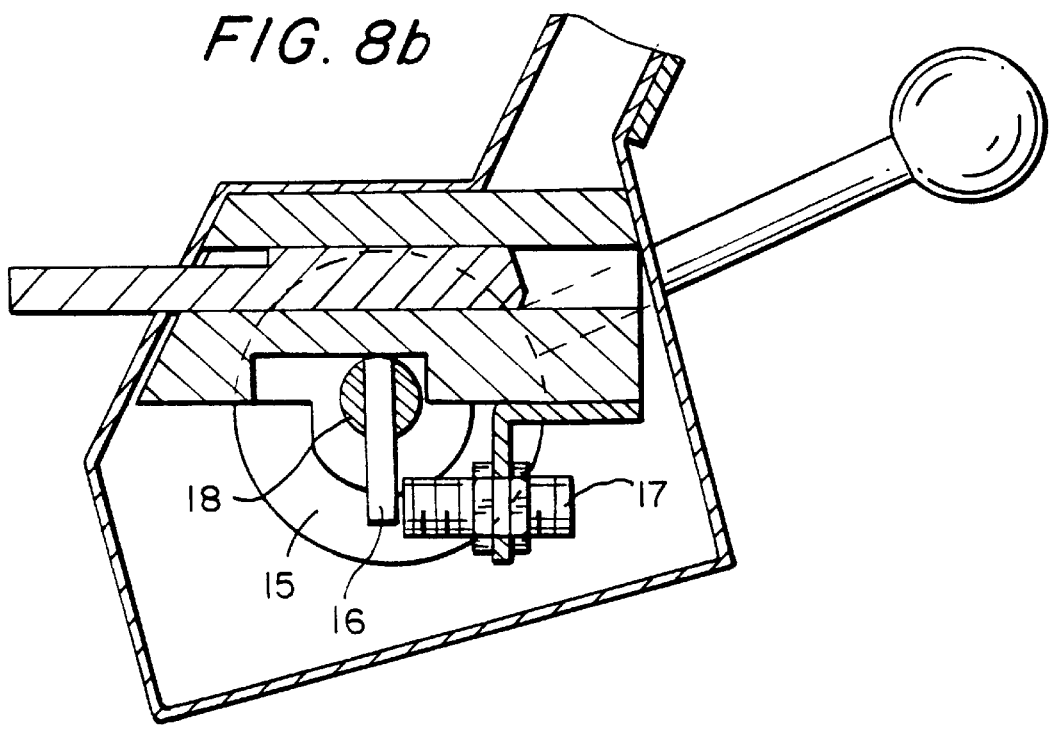
FIG. 8B shows a cross-sectional view of the control device taken along the line 8—8 of FIG. 5 in the engaged condition.

When the carriage 5 and the control device 4 are engaged for longitudinal movement in tandem as shown in FIG. 4A, it is often required to inhibit the speed of movement thereof for safety reasons. In this respect, and as shown in FIGS. 8A and 8B, the shaft 18 carries a pin 16 which is arranged to inductively activate a proximity switch 17. Actuation of the proximity switch 17 operates inhibiting means (not shown) which prevent rapid traverse of both carriages 5 and 6. FIG. 8A shows the condition of the rack 13 in its withdrawn, disengaged position in which the proximity switch 17 is not actuated, whereas FIG. 8B shows the situation when the rack 13 is extended to engage the carriage arm 14 and the proximity switch 17 is actuated.

In the illustrated embodiment, inductive operation of the switch 17 is provided. However, it will be appreciated that, alternatively, mechanically operated switches may be used without deviating from the scope and spirit of the invention.

Thus, and often required by law in certain countries, upon engagement of the carriage 5 and the control device 4 for longitudinal movement in tandem, inhibiting means are operated to prevent rapid traverse of the carriages 5 and 6. However, when the carriage 5 and the control device 4 are uncoupled, whereby automatic operation under the control of the CNC unit 22 is enabled, there is no inhibition on the speed of the carriages. Nevertheless, there is no increased risk to safety in this mode because, although the control device 4 is external to the covers 3, in the uncoupled condition there is no movement thereof All of the rapidly moving parts, during automatic operation, namely the carriages 5 and 6, will be within the covers 3 in a known manner.

The ability to couple and decouple the control device 4 and the carriage 5 provides the operator a choice of relative positions between the two. Thus, the machine operator can choose to couple the control device 4 to the carriage 5 at any position along the working travel of the carriage 5 to suit the operator's requirements.

Figure 9:
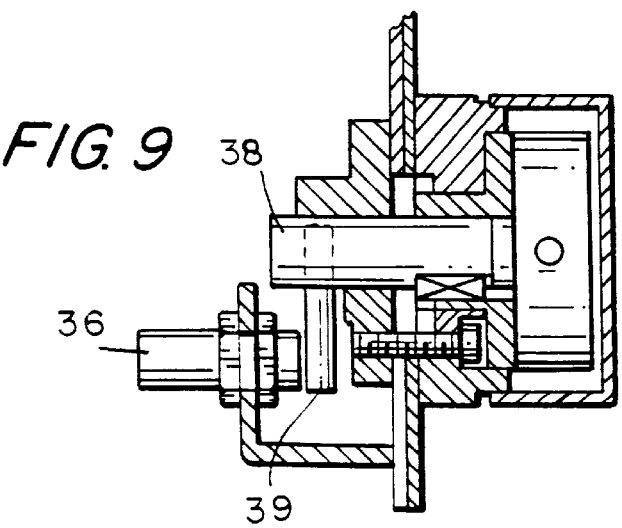
FIG. 9 shows a sectional view of the control device taken along the line 9—9 of FIG. 5. showing a control lever 12 to run the main electric motor.

The control device 4 has, as is apparent from FIG. 5, a second control lever 12. This control lever 12 used, during manual operation of the machine tool, to run the main electric motor and to select the direction of rotation of the headstock chuck 29. In this respect, and shown FIG. 9, rotation of the lever 12 rotates an inductive pin 39 carried on a shaft 38 coupled to the lever 12 whereby a proximity switch 36 controlling the operation of the main motor is operated.

The examples provided above are not meant to be exclusive. Many other variations of the present invention would be obvious to those skilled in the art, and are contemplated to be within the scope of the appended claims.

I claim:

1. A machine tool comprising
a stationary supporting member comprising a wall fixed with respect to a bed of the machine tool,
a carriage movable in a first direction,
a control device for controlling movement of said carriage in the first direction, said control device being supported on said supporting member for movement in the first direction, said control device being separate from said carriage such that said carriage is movable in the first direction relative to said control device,
engaging means for enabling said carriage and said control device to be selectively engaged for movement of both said carriage and said control device in the first direction and selectively disengaged such that said carriage is movable in the first direction and said control device remains in a stationary position and does not move with said carriage in the first direction, and
cooperating guide means arranged on said control device and said wall for enabling sliding movement of said control device in the first direction, said cooperating guide means comprising longitudinally extending guideways defined by or arranged on said wall and rollers arranged on said control device to slide within said guideways.

2. The machine tool of claim 1, wherein said engaging means comprise means for preventing rapid traverse of said carriage when said control device and said carriage are engaged.

3. A machine tool comprising
a stationary supporting member,
a carriage movable in a first direction,
a control device for controlling movement of said carriage in the first direction, said control device being supported on said supporting member for movement in the first direction, said control device being separate from said carriage such that said carriage is movable in the first direction relative to said control device, and
engaging means for enabling said carriage and said control device to be selectively engaged for movement of both said carriage and said control device in the first direction and selectively disengaged such that said carriage is movable in the first direction and said control device remains in a stationary position and does not move with said carriage in the first direction,
said engaging means comprising means for preventing rapid traverse of said carriage when said control device and said carriage are engaged, said rapid traverse preventing means comprising a switch actuatable by engagement of said carriage and said control device.

4. The machine tool of claim 1, further comprising at least one movable cover for covering said carriage, said at least one cover being supported on said supporting member for movement in the first direction.

5. A machine tool comprising a stationary supporting member, a carriage movable in a first direction, a control device for controlling movement of said carriage in the first direction, said control device being supported on said supporting member for movement in the first direction, said control device being separate from said carriage such that said carriage is movable in the first direction relative to said control device, and engaging means for enabling said carriage and said control device to be selectively engaged for movement of both said carriage and said control device in the first direction and selectively disengaged such that said carriage is movable in the first direction and said control device remains in a stationary position and does not move with said carriage in the first direction, said engaging means comprising at least one projection arranged on said carriage, said control device having at least one member having a recess corresponding to said at least one projection such that each of said at least one projection is engageable in the corresponding recess, and displacement means for displacing said at least one member of said control device such that said recess therein is moved into and out of engagement with the corresponding projection.

6. The machine tool of claim 5, wherein said at least one member of said control device comprises a movable rack.

7. The machine tool of claim 5, wherein said displacement means further comprise a movable lever mounted on a shaft and a gear mounted on said shaft such that said gear is rotated upon movement of said lever, said gear cooperating with said at least one member to move said at least one member upon rotation of said gear.

8. The machine tool of claim 7, wherein said engaging means further comprise means for preventing rapid traverse of said carriage when said control device and said carriage are engaged, said rapid traverse preventing means comprising a pin mounted on said shaft and movable upon rotation of said shaft and a switch actuatable by engagement with said pin.

9. The machine tool of claim 1, further comprising an additional carriage movable in a second direction substantially perpendicular to the first direction.

10. A machine tool comprising a stationary supporting member comprising a wall fixed with respect to a bed of the machine tool, a carriage movable in a first direction, a control device for controlling movement of said carriage in the first direction, said control device being supported on said supporting member for movement in the first direction, said control device being separate from said carriage such that said carriage is movable independent of said control device, engaging means for moving said control device between a first position in which said control device and said carriage are engaged for movement of both said carriage and said control device in the first direction and a second position in which said control device and said carriage are disengaged such that said carriage is movable in the first direction and said control device remains in a stationary position and does not move with said carriage in the first direction, and cooperating guide means arranged on said control device and said wall for enabling sliding movement of said control device in the first direction, said cooperating guide means comprising longitudinally extending guideways defined by or arranged on said wall and rollers arranged on said control device to slide within said guideways.

11. The machine tool of claim 10, wherein said engaging means comprise means for preventing rapid traverse of said carriage when said control device and said carriage are engaged.

12. The machine tool of claim 10, further comprising at least one movable cover for covering said carriage, said at least one cover being supported on said supporting member for movement in the first direction. positions.

13. A machine tool comprising a stationary supporting member, a carriage movable in a first direction, a control device for controlling movement of said carriage in the first direction, said control device being supported on said supporting member for movement in the first direction, said control device being separate from said carriage such that said carriage is movable independent of said control device, and engaging means for moving said control device between a first position in which said control device and said carriage are engaged for movement of both said carriage and said control device in the first direction and a second position in which said control device and said carriage are disengaged such that said carriage is movable in the first direction and said control device remains in a stationary position and does not move with said carriage in the first direction, said engaging means comprising at least one projection arranged on said carriage, said control device having at least one member having a recess corresponding to said at least one projection such that each of said at least one projection engages in the corresponding recess when said control device is in said first position, and displacement means for displacing said at least one member of said control device such that said recess therein is moved into and out of engagement with the corresponding projection between said first and second positions.

14. The machine tool of claim 13, wherein said at least one member of said control device comprises a movable rack.

15. The machine tool of claim 13, wherein said displacement means further comprise a movable lever mounted on a shaft and a gear mounted on said shaft such that said gear is rotated upon movement of said lever, said gear cooperating with said at least one member to move said at least one member upon rotation of said gear.

16. The machine tool of claim 15, wherein said engaging means further comprise means for preventing rapid traverse of said carriage when said control device and said carriage are engaged, said rapid traverse preventing means comprising a pin mounted on said shaft and movable upon rotation of said shaft and a switch actuatable by engagement with said pin.

17. The machine tool of claim 10, further comprising an additional carriage movable in a second direction substantially perpendicular to the first direction.

18. A machine tool comprising a stationary supporting member, a carriage movable in a first direction, a control device for controlling movement of said carriage in the first direction, said control device being supported on said supporting member for movement in the first direction, said control device being separate from said carriage such that said carriage is movable independent of said control device, and engaging means for moving said control device between a first position in which said control device and said carriage are engaged for movement of both said carriage and said control device in the first direction and a second position in which said control device and said carriage are disengaged such that said carriage is movable in the first direction and said control device remains in a stationary position and does not move with said carriage in the first direction, said engaging means comprising means for preventing rapid traverse of said carriage when said control device and said carriage are engaged said rapid traverse preventing means comprising a switch actuatable by engagement of said carriage and said control device.

19. A machine tool comprising a stationary supporting member, a carriage movable in a first direction, a control device for controlling movement of said carriage in the first direction, said control device being supported on said supporting member for movement in the first direction, and engaging means for enabling said carriage and said control device to be selectively engaged for movement in the first direction and selectively disengaged whereby said control device does not move with said carriage in the first direction, said engaging means comprising means for preventing rapid traverse of said carriage when said control device and said carriage are engaged, said rapid traverse preventing means comprising a switch actuatable by engagement of said carriage and said control device.

20. A machine tool comprising a stationary supporting member comprising a wall fixed with respect to a bed of the machine tool, a carriage movable in a first direction, a control device for controlling movement of said carriage in the first direction, said control device being supported on said supporting member for movement in the first direction, engaging means for enabling said carriage and said control device to be selectively engaged for movement in the first direction and selectively disengaged whereby said control device does not move with said carriage in the first direction, and cooperating guide means arranged on said control device and said wall for enabling sliding movement of said control device in the first direction, said cooperating guide means comprising longitudinally extending guideways defined by or arranged on said wall and rollers arranged on said control device to slide within said guideways.

21. A machine tool comprising a stationary supporting member, a carriage movable in a first direction, a control device for controlling movement of said carriage in the first direction, said control device being supported on said supporting member for movement in the first direction, and engaging means for enabling said carriage and said control device to be selectively engaged for movement in the first direction and selectively disengaged whereby said control device does not move with said carriage in the first direction, said engaging means comprising at least one projection arranged on said carriage, said control device having at least one member having a recess corresponding to said at least one projection such that each of said at least one projection is engageable in the corresponding recess, and displacement means for displacing said at least one member of said control device such that said recess therein is moved into and out of engagement with the corresponding projection, said at least one member of said control device comprising a movable rack, said displacement means further comprising a movable lever mounted on a shaft and a gear mounted on said shaft such that said gear is rotated upon movement of said lever, said gear cooperating with said at least one member to move said at least one member upon rotation of said gear.

22. The machine tool of claim 21, wherein said engaging means further comprise means for preventing rapid traverse of said carriage when said control device and said carriage are engaged.

* * * * *